Sept. 22, 1964    P. SPERGEL    3,150,253
PRODUCT ANALYZER
Filed July 11, 1961    3 Sheets-Sheet 3
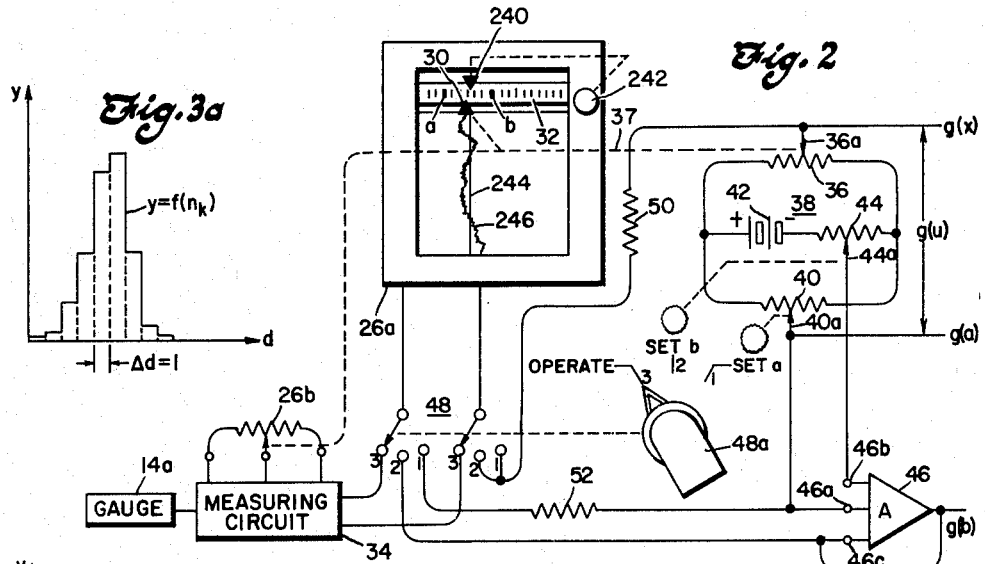
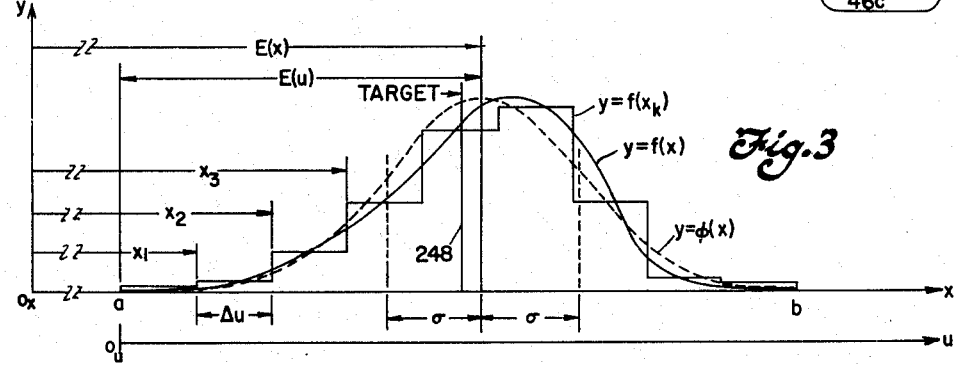
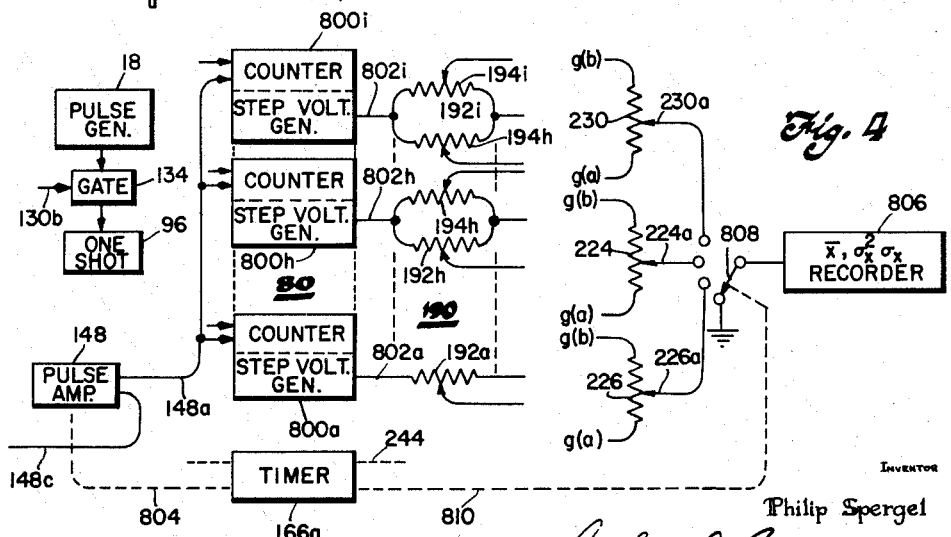
INVENTOR
Philip Spergel
by Anthony D. Cennamo
ATTORNEY

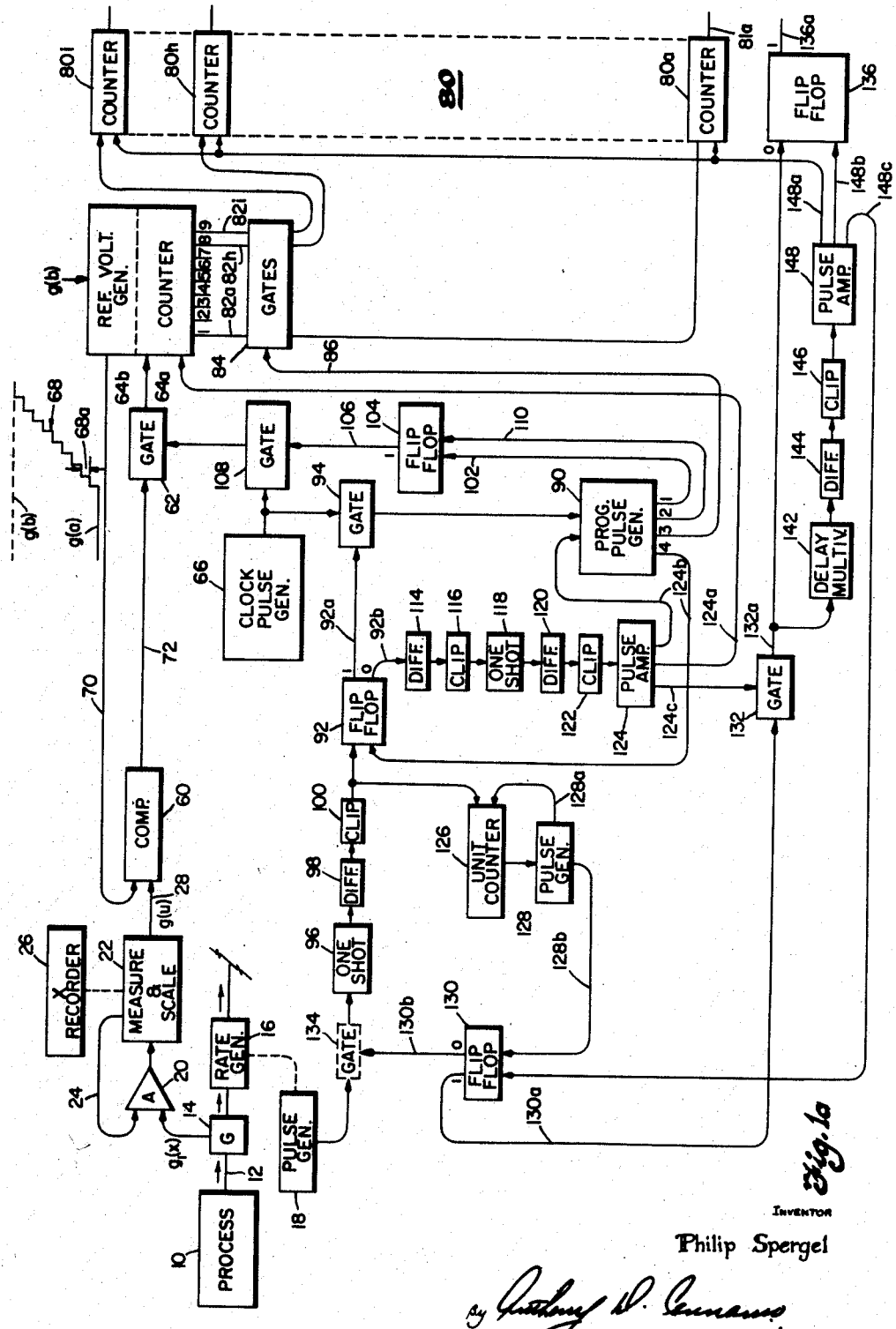

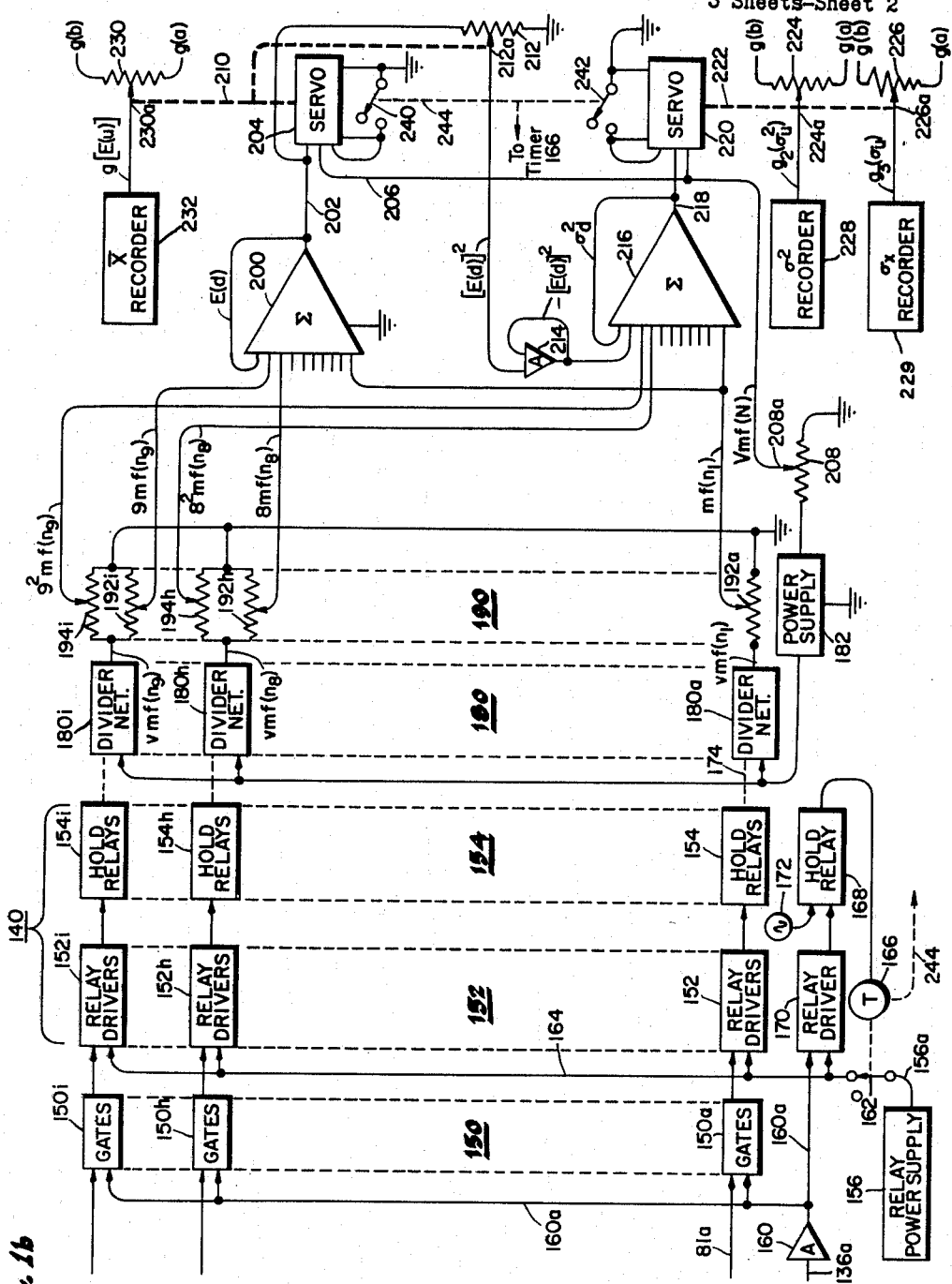

United States Patent Office 3,150,253
Patented Sept. 22, 1964

1

3,150,253
PRODUCT ANALYZER
Philip Spergel, Saxonville, Mass., assignor to Industrial
Nucleonics Corporation, a corporation of Ohio
Filed July 11, 1961, Ser. No. 123,179
11 Claims. (Cl. 235—151)

This invention relates to industrial quality control systems, and more particularly it relates to apparatus for evaluating the performance of an industrial process by automatic statistical analysis of the material product thereof.

The system of the invention includes a suitable automatic gauging device designed or adapted to render a continuous or intermittent electrical analog of measured values or variations in some characteristic of a material product issuing from a continuous processing machine or passing through an inspection line. The system further includes computer means receiving said analog as an input, and providing automatic, periodic readout of the variance, the standard deviation (sigma) and the mean.

The ready availability of these statistical figures provides advantages which are well recognized in industrial quality control. It will suffice to state that until very recent times the importance of these figures has justified a costly and time consuming manual procedure of gathering samples, measuring and classifying the same, recording data and making the necessary computations therewith. They have been invaluable in optimizing the selection of raw materials and sources thereof, in comparative appraisal of alternative manufacturing methods, in evaluating the effects of environmental factors on the performance of workmen, in determining the inherent precision of various types of machines, in timely detection of maladjustment or impending failure of machinery in service, in establishing realistic tolerances, in improving vendor-consumer relations and in general upgrading the quality of manufactured goods while decreasing the production costs thereof. The utility of an automatic device for providing these figures without any necessity for extensive labor and long delay in obtaining the results is therefore apparent.

In accordance with the preferred embodiment of the invention herein illustrated and described, a novel modification of a well-known analog to digital conversion technique is employed to register the density function of the measured variable, which is tallied and stored in digital form, thereby preventing the occurrence of cumulative errors in summation even over long periods of time. For the mathematical computations, however, reversion is made to the use of analog devices, whereby the cost of the system is materially reduced, and the computer outputs are delivered as analog voltages which may be indicated with simple meters or recorders. These voltages may be further connected to simple alarm signal devices in order that operating personnel will be alerted whenever a limiting value is exceeded as a result of a malfunction in some part of the processing machinery or in the control apparatus therefor.

It is an object of this invention to provide means for generating a process density function at high speed, whereby variance or sigma values for suitably small incremental units of a continuously formed product can be computed while said product is traveling at a very rapid rate past a measuring station.

It is another object to provide a statistical computer utilizing digital storage for memory accuracy in combination with economical analog computer stages, and whose readout is in the form of analog voltages compatible with those utilized in conventional automatic gauging and controlling systems.

It is yet another object to provide a statistical computer for analyzing a continuously formed product, whereby the computed variance and sigma values are related to a constant unit length of said product even though the processing machine is operated at a variable rate.

Further objects and advantages of the invention will become apparent in the following detailed description, taken in connection with the appended drawings, in which:

FIGS. 1a and 1b, when mutually connected in the order named from left to right, constitute a schematic showing of one preferred embodiment of the invention.

FIG. 2 is a showing of circuits whereby the computer of the present invention may be coupled to a conventional recorder such as those presently employed in the measuring and recording of a great variety of industrial processes.

FIGS. 3 and 3a constitute a graphical showing of a plurality of related density functions useful in the explanation of the principles of the statistical computer of the present invention.

FIG. 4 is a block diagram showing a modification of the apparatus of FIGS. 1a and 1b in accordance with another embodiment of the present invention.

Referring to FIG. 1a there is shown an industrial processing machine 10 continuously producing a traveling, elongated material product 12. A gauging head 14 installed near the output of the machine 10 is responsive to some physical property of the material 12. There is also provided a device 16 responsive to the rate of production of material 12.

The situation with respect to items 10–16 is characteristic of an infinite variety of industrial processes and the showing thereof is meant to be quite general; however, a few specific examples may be appropriate. In a first example the machine 10 comprises an extruder for plastic sheet material 12, the gauge 14 comprises a thickness gauge such as that described in Patent No. 2,790,945, and the device 16 comprises a wheel in tractive engagement with the plastic sheet 12 and a set of switch contacts for momentarily completing an electrical circuit each time the periphery of the wheel is rotated a distance of one yard. Thus an interconnected pulse generator 18 is enabled to generate an electrical pulse each time one linear yard of plastic sheet 12 passes the gauging head 14.

In another example the machine 10 comprises a cigarette making machine, the material 12 is the continuous cigarette rod formed thereby, the gauge 14 is as described in Patent No. 2,955,206 and the device 16 comprises photoelectric means such as is described in Patent No. 2,954,775 for counting individual cigarettes cut from the rod 12, whereby the pulse generator 18 is enabled to generate a pulse each time a finished cigarette issues from the machine 10.

In still another example, the device 10 comprises a chemical processing apparatus wherefrom a product fluid 12 is piped to a multicomponent analyzer 14 of a type such as is described in Patent No. 2,926,253, and the device 16 comprises a positive displacement type flowmeter whereby, for example, the pulse generator 18 is enabled to generate a pulse each time a gallon of fluid passes through the analyzer 14.

If the variable characteristic of material 12 which is measured by gauge 14 is designated as $x$, the gauge is adapted to provide a voltage analog $g_1(x)$ thereof which is conventionally amplified by a feedback amplifier 20. Also provided are measuring and scaling circuits 22 which may be included in the feedback loop 24 of the amplifier 20 in the manner of the translating circuits shown in Patent No. 2,955,206. A suitable recorder 26 may be included to continuously record the value of the measured process variable $x$.

The measuring and scaling circuits 22 are adapted to provide, on line 28, a variable voltage designated as $g(u)=cg(x-a)$ wherein $c$ is a constant and $a$ is a selected, constant value of the variable $x$. Since the process 10 is controlled within limits, the material 12 is not expected to assume all values of $x$; on the other hand, $x$ normally varies only between a low limit designated as $a$ and a high limit designated as $b$. Accordingly the circuits 22 are calibrated so that $g(u)$ will have a pre-selected value when $x=b$.

For example, FIG. 1a of the aforementioned Patent No. 2,955,206 discloses circuits whereby a suitable voltage $g(u)$ may be derived from the wiper 91 of a variable potentiometer 92 which can be adjusted to select a suitable value for the constant $a$, and wherein the factor $c$ can be adjusted to a suitable value by means of a variable potentiometer 98.

In FIG. 2 there is shown one way in which a suitable analog voltage $g(u)$ may be derived from a conventional strip chart recorder 26a. Such a recorder comprises a servo rebalancing potentiometer device adapted to translate the output signal from a transducer or gauging device 14a to a mechanical positioning of a pen and pointer assembly 30 which moves relative to a calibrated scale 32. The range of values presented on scale 32 includes the low and high limits $a$ and $b$ respectively of the expected variation in the measured property $x$.

The recorder 26a conventionally employs a servomotor-driven slidewire potentiometer 26b associated with measuring circuits 34 in connection with the gauge 14a in the manner shown in Patent No. 2,829,268, the slidewire being mechanically connected to the recorder pen and pointer assembly 30.

A further "repeat" slidewire 36 is also mechanically connected to the pen and pointer as indicated by the dotted line 37, whereby the movement of the pen and pointer is communicated to the wiper 36a of the repeat slidewire 36. Slidewire 36 forms one arm of a bridge circuit 38 having a manually adjustable potentiometer 40 forming the other arm thereof. The bridge circuit is energized by a voltage source represented by a battery 42 through a dropping potentiometer 44. Since the position of the wiper 36a varies in accordance with the indicated value of the measured variable $x$, an analog voltage $g(x)$ appears at the wiper connection. The wiper 40a of potentiometer 40 is manually set so that the voltage appearing thereon is equal to the value of $g(x)$ which is derived from wiper 36a when the pen and pointer 30 indicates the value $a$ on the recorder scale 32. The desired analog voltage $g(u)$ is the difference between the potentials at wipers 36a and 40a.

It is further desired to obtain an analog voltage $g(b)$ equal to the value of the voltage $g(x)$ when the pen and pointer 30 assembly indicates the value $b$ on the recorder scale 32. As will become apparent in the following description, the voltage $g(b)$ should be conveniently variable in accordance with the selected values of $a$ and $b$; it should be electronically regulated so as to remain constant in spite of appreciable variations in the load connected thereto; said load should not be permitted to load the bridge circuit 38, and said $g(b)$ voltage should be automatically compensated for changes in the bridge voltage which might occur, for example, as the result of decay of the battery 42.

Accordingly the voltage $g(b)$ is obtained from the output of an amplifier 46 having substantial open loop gain and stabilized by inverse feedback, and having a common terminal 46a receiving the reference potential $g(a)$ from the bridge 38. Since the amplifier is characteristically a phase inverter, the input terminal 46b is connected to the wiper 44a of potentiometer 44, at lower positive potential than the arms of the bridge, whereby the amplifier output assumes positive potentials with respect to the reference potential $g(a)$ in the manner of potential $g(x)$.

The values of the parameters $a$ and $b$, as well as the production target value of $x$, are ordinarily predetermined by the manufacturer's quality control section, and specified on the production order delivered to the operator of the process machine 10. Potentiometers 40 and 44 are panel-mounted in conjunction with a set-up switch 48 having a pointer knob 48a which the operator rotates to a first position identified as "Set $a$." This disconnects the recorder 26a from the measuring circuits 34 and connect it between potentiometer wipers 36a and 40a of the bridge 38 through suitable current limiting resistors 50 and 52. The recorder servomechanism now drives potentiometer wiper 36a to the point where its potential is equal to the potential of wiper 40a. By adjusting the "Set $a$" knob associated with potentiometer 40, the operator causes the pen and pointer 30 to assume position $a$ with respect to scale 32, whereby wiper 40a assumes the proper potential $g(a)$.

The operator next rotates switch knob 48a to the second position identified as "Set $b$," whereby the recorder input is connected between wiper 36a and the output of amplifier 46, whereupon the wiper 36a is automatically driven to a point wherein the wiper potential is equal to the amplifier output potential. By adjusting the "Set $b$" knob associated with potentiometer 44, the operator causes pen and pointer 30 to assume position $b$ on scale, whereby the amplifier output assumes the proper potential $g(b)$. On returning the switch 48 to the third or "Operate" position, the recorder pen and pointer 30 will follow the time variations in the variable property $x$ measured by gauge 14a, and the variable analog voltage $g(u)$ is obtained at the output of the repeat slidewire bridge 38.

Referring again to FIG. 1a, it is seen that the voltage $g(u)$ is delivered to a special type of analog to digital converter system comprising a comparator unit 60, a gate 62, and a pulse counter 64a and reference voltage generator 64b combination. This general arrangement for analog to digital conversion is well known, and many specific devices of known construction may be used.

One device which is particularly adapted to cooperate with the circuit of FIG. 2 or its equivalent to provide automatic voltage sensitivity compensation is described in the copending application of David L. Spooner, Serial No. 736,221, filed May 19, 1958, now Patent No. 3,026,033. This device comprises an electronic decade counter adapted to register from one to nine pulses originating with a clock pulse generator 66. As the accumulated pulses are registered sequentially by the counter 64a, the associated reference voltage generator 64b generates the waveform shown at 68, which originates in a counter-switched digital voltage divider network (not shown) receiving the reference voltage $g(b)$ from the circuit of FIG. 2. Each time a clock pulse is delivered to the counter 64a through gate 62, an increment as at 68a of the voltage $g(b)$ is added to the output voltage from generator 64b.

The reference voltage generator output is delivered via line 70 to the comparator 60, whereby it is continuously compared with the analog voltage $g(u)$ appearing on line 28. The comparator 60 provides an output on line 72 when the reference voltage on line 70 exceeds the value of the analog voltage on line 28. The comparator output, when present, provides a disabling signal to gate 62, thereby preventing pulses from the clock pulse generator 66 (via gate 108 to be described) from further advancing the counter 64a.

The analog to digital converter system is designed to operate cyclically and repeatedly in a manner to be described. On completion of each operation of the converter, the pulse count standing in the counter 64a indicates a digital value for the amplitude of $g(u)$ at the time the count is completed. Ordinarily no more than nine such digital values will be required, and accordingly a single decade counter will suffice for unit 64a.

Each time a digital value as aforesaid is registered by the counter 64a, it is desired to transfer said value to an accumulator section 80. In the exemplary device being described, there are nine individual counters 80a–80i in section 80, only three counters 80a, 80h and 80i being individually shown.

Accordingly the decade counter 64a is provided with a plurality of outputs 82a–82i which are connected to the enabling inputs of a like plurality of gates at 84. Gates 84 have a common driver input 86 which is pulsed once (by means to be described) each time the data in counter 64a is to be registered in the appropriate counter of the accumulator section 80. Hence if a count of one standing in counter 64a is manifested by an output signal on line 82a, the registration pulse on line 86 is passed to the first counter 80a of section 80, the inputs to the other counters thereof being blocked by the other gates in group 84. Likewise if a count of eight standing in counter 64a is manifested by an output signal on line 82h, the registration pulse on line 86 is passed only to the eighth counter 80h of section 80.

The operation of the data accumulation means above outlined may now be more fully described in relation to its associated time modulator system. This system includes a programmed pulse generator 90 which is paced by the clock pulse generator 66 and controlled by a binary flip-flop 92 and gate 94. A cyclic program is initiated when a pulse is delivered by the material product unit pulse generator 18. This pulse is transmitted through a gate 134, whose purpose is described hereinafter, and triggers a one-shot multivibrator 96. The output of the one-shot multivibrator is differentiated and clipped by circuits 98 and 100, and the trailing edge of the pulse is utilized to "turn on" the flip-flop 92. When "on" the output 92a of the flip-flop 92 enables gate 94, allowing clock pulses from generator 66 to drive the programmed pulse generator 90.

Basically, the programmed generator 90 comprises a pulse counter which may utilize a conventional counting chain of bistable multivibrators or a pair of decade counter tubes wherein certain selected multivibrators or certain selected cathodes of the decade tubes are coupled to pulse outputs numbered one to four as shown.

Accordingly when a first pulse passes gate 94 to produce a count of one, an output pulse appears at the first output of the generator 90. This pulse, delivered via line 102 to a binary flip-flop 104, turns the flip-flop "on," whereby the output 106 of the flip-flop enables gate 108, allowing pulses from the clock pulse generator to be delivered to gate 62 of the analog to digital converter system.

In the illustrative case, only nine clock pulses are required to effect a conversion. Accordingly when, say, the tenth pulse is counted by the programmed generator 90, it will generate a pulse at its second output, which is delivered over line 110 to the reset input of flip-flop 104. When thus reset, the flip-flop will cease to provide the gate signal on line 106.

The count now standing in a counter 64a represents the result of an analog to digital conversion. On the next clock pulse, an output pulse will appear at the third output of generator 90, which pulse is delivered via line 86 to the inputs of gates 84 and will be routed thereby to the proper counter in the accumulator section 80 as hereinabove explained. On the succeeding clock pulse, an output pulse will appear at the fourth output of generator 90, which pulse is delivered via line 112 to the reset input of flip-flop 92. When reset, this flip-flop ceases to furnish the gating signal which enabled gate 94, thus blocking the flow of clock pulses from the clock pulse generator 66 to the programmed pulse generator 90. It is seen that the flip-flop 92 has an alternate, binary zero output 92b which is energized when the flip-flop is switched to reset condition. The signal at this output is differentiated and clipped by circuits at 114 and 116 to provide a pulse which triggers a one-shot multivibrator 118. The multivibrator output in turn is differentiated and clipped by circuits at 120 and 122, whereby the trailing edge of the multivibrator output pulse is utilized to provide a slightly delayed pulse signal which energizes a pulse amplifier 124. Thereupon an output pulse from amplifier 124 is delivered simultaneously via lines 124a, 124b and 124c to the reset input of counter 64a, the reset input of the programmed pulse generator 90, and to the pulse input of a gate 132 whose purpose is to be described hereinafter. On resetting the counter 64a and reference voltage generator 64b, as well as resetting the programmed pulse generator 90, the system is ready to repeat the hereinabove described conversion and tally operation on receipt of the next product unit pulse from the pulse generator 18.

The conversion and accumulation cycle is repeated a sufficient number of times to obtain the necessary precision in the computation, said number being herein designated as N. Accordingly there is provided a product unit counter 126 adapted to signal the completion of N product units. The counter 126 is advanced one digit for each pulse generated by the one-shot multivibrator 96, more specifically, by each output pulse from the clipper circuit 100. The counter 126 is adapted to provide an output signal when it receives the Nth pulse, thereby triggering a pulse generator 128 which in turn delivers a reset pulse, via line 128a, which resets the counter 126. The pulse generator 128 also delivers a set pulse, via line 128b, to a binary flip-flop 130.

When set as described, the flip-flop 130 delivers a binary one output via line 130a as an enabling input signal to a gate 132.

There is also illustrated the gate 134, referred to hereinabove, connected to a binary zero output 130b of flip-flop 130. Gate 134 is shown in dotted lines because it is not ordinarily required with the illustrated preferred embodiment of the computer. In the event, however, that the process rate approaches the limiting speed of the analog to digital conversion and accumulator apparatus, it may be necessary to block one pulse from the product unit pulse generator 18, thus omitting one conversion cycle and thereby discarding the evaluation of one product unit in order to gain time to read out the accumulators 80. Such omission will have negligible statistical significance. It is sometimes desirable also to provide a more economical computer by omitting the herein illustrated buffer storage system, whereby the cost of the buffer storage device can be saved if it is permissible to suspend the entire process evaluation during the time required for the analog computation and readout of the data, as will appear hereinafter.

As has been explained, the normally closed gate 132 is enabled at the beginning of the Nth analog to digital conversion and accumulation cycle. At the end of this cycle, therefore, the output pulse on line 124c from the pulse amplifier 124 will pass the anabled gate 132 and, via line 132a, will trigger a flip-flop 136. When "turned on," the flip-flop 136 generates a signal at its output 136a which causes the data stored in the accumulator section 80 to be transferred to a buffer storage section 140 in a manner to be described. After a slight delay which is allowed to effect the transfer, the accumulator counters 80a–80i are reset.

The delay is effected by a delay multivibrator 142 which is triggered by the pulse on line 132a. The delay multivibrator provides a rectangular pulse which is differentiated and clipped by circuits 144 and 146 whereby the trailing edge of the rectangular pulse triggers a pulse amplifier 148. The pulse amplifier provides an output pulse simultaneously on each of lines 148a, 148b and 148c, which respectively reset the counters 80a–80i, the flip-flop 136 and the flip-flop 130.

The complete cycle of operation hereinabove described will immediately being anew, whereby the accumulation of new data in section 80 will proceed while the statistical computations are performed on the data standing in the buffer storage section 140.

Section 140 may employ any one of a number of electro-mechanical or all-electronic devices well known in the art, but it is chosen to illustrate the same as a bank of hold relays 154 having associated relay drivers 152 which in turn are controlled by gates 150. For this particular embodiment it is preferred to employ thyratron circuits such as are described in Patent No. 2,964,707. Accordingly the function of gates 150 is performed by summing resistors connected to the thyratron grids, the thyratrons are used as relay drivers, and by the use of a D.C. power supply as at 156 for the thyratrons, these tubes also perform the holding function for the relays 154.

Returning to the condition obtaining when N pulse counts have been distributed among the counters in the accumulator section 80, at that time each of the counters 80a to 80i provides a plurality of parallel output signals to its associated set of gates in section 150. For example, line 81a represents a plurality of lines connecting the successive stages of counter 80a to the plurality of gates at 150a. In the conventional manner, the particular combination of energized lines in group 81a provides a parallel code signal indicative of the number of counts accumulated in counter 80a. Each line which is so energized provides an enabling signal to its associated gate. Hence, when at the completion of an accumulation of N counts the flip-flop 136 provides its binary output signal on line 136a, and an amplifier 160 delivers an amplified signal to line 160a to energize the other input of all gates in section 150, each gate which is enabled by a counter output signal in turn energizes its associated relay driver and hold relay in section 140. The relays so energizer will remain energized so long as the relay power supply 156 remains connected to the drivers via line 156a, a switch 162 and line 164. It is seen that the switch 162 is operated by a clock timer 166 which is controlled by a hold relay 168 and driver 170. Relay 168 is energized and held in the same manner as the buffer storge relays 154, and its contacts are used to connect the synchronous motor (not shown) of the clock timer to the conventional line voltage source 172. At the end of a time interval sufficient to complete the analog computations, the timer will time out, opening switch 162 and thereby de-energizing all the hold relays including timer relay 168 whereby power is also removed from the timer, allowing it to reset.

The dotted line connections as at 174 indicate that the contacts of each group of relays as at 154a are connected in the circuits of an associated digital voltage divider network as at 180a. Each of the plurality of such networks in section 180 may be any one of several conventional types, for example, a simplified version of the type disclosed in Patent No. 2,813,987. These networks are powered by a suitable D.C. power supply 182, and each is adapted to provide an analog voltage output proportional to the digital count previously accumulated by its associated counter in section 80 and thereafter transferred in a digital code to its associated buffer storage relay group age may be designated by the expression $$V_k = vmf(n_k) \quad (1)$$

where $V_k$ is the voltage output of the $k$th voltage divider network, $v$ is a design parameter determined in accordance with such variables as the number of voltage divider networks used, the maximum number of counts to be converted to an analog voltage by a given network, the character of the power supply 182 and so forth, wherein $m$ is the analog equivalent of one unit of moment in the statistical computation and $f(n_k)$ is the actual number of counts indicated by the $k$th network output.

It is understood that the values of $v$ and $m$ are purely arbitrary; however, to give an example in round numbers $v$ may have the value of one hundred reciprocal counts and $m$ may have the value of one millivolt. Accordingly if a particular counter, buffer storage unit and voltage divider network combination has a capacity of one thousand counts, the network is adapted to provide up to one hundred volts in equal increments of one hundred millivolts.

The voltage output of each network in group 180 appears across a pair of variable potentiometer resistors connected in parallel, in a calibrating network 190. One potentiometer resistor in each pair is set to provide an analog voltage given by the expression $kmf(n_k)$, as is the case, for example, with potentiometer resistors 192a, 192h and 192i. The other potentiometer resistor in each pair is set to provide an analog voltage given by the expression $k^2mf(n_k)$, as is the case, for example, with potentiometer resistors 192a, 194h and 194i. Potentiometer 192a is a member of both groups since in this case the value of $k$ is unity. It is apparent that the value of $v$ set forth in Equation 1 above must be larger than $k^2$, and further that the networks in section 180 need not be all identical as shown, although this may be desirable from the production standpoint.

The variable taps of potentiometers 192a–192i are connected as inputs to a first summing amplifier 200. The output 202 of the summing amplifier is connected as one input to a conventional electromechanical servo rebalancing potentiometer device 204. The servo 204 also receives a reference voltage input on line 206 which is derived from the variable tap 208a of a potentiometer 208 connected across the power supply 182. Potentiometer 208 is set to provide the reference voltage in accordance with the expression $Vmf(N)$ wherein V is a suitable scale factor and $f(N)$ is the total accumulator count determined by the product unit counter 126 as hereinabove described. The servo 204 is adapted to produce a mechanical rotation of its associated shaft, represented by the dotted line 210, which is proportional to the ratio of the voltages on lines 202 and 206 respectively.

It is seen that the voltage on line 202 appears across a potentiometer 212 having a variable tap 212a which is driven by the output of the servo 204. Since the movement of the tap as well as the voltage across the potentiometer is proportional to the voltage on line 202, the voltage appearing at tap 212a is proportional to the square of the voltage on line 202. Tap 212a is connected to the input of an operational amplifier 214 having unity gain which changes the algebraic sign of the voltage applied to its input by providing an output voltage equal in amplitude to the input voltage but having reversed polarity.

The output of the sign changing amplifier 214 is connected to one input of a summing amplifier 216 which also has a plurality of other inputs connected to the variable taps of potentiometers 192a and 194b–194i. The output 218 of the summing amplifier 216 is connected to the input of a servo 220, similar to servo 204, which drives its shaft indicated by the dotted line 222 in proportion to the ratio of the voltages on lines 218 and 206 respectively.

The shaft 222 in turn drives the variable taps 224a and 226a of a pair of potentiometers 224 and 226 each having the potentials $g(a)$ and $g(b)$, described in connection with FIG. 2, applied to the opposite ends thereof. As will appear more clearly in the explanation given hereinafter, the rotation of the servo shaft 222 is proportional to the variance of the process. Potentiometer 224 is the ordinary linear potentiometer and therefore the potential at its variable tap 224a will be proportional to the rotation of the servo shaft 222. Thus the arbitrary mechanical motion analog of the variance is multiplied by the original scale factor $(b-a)$ to obtain at tap 224a a voltage analog designated as $g_2(\sigma_u^2)$ which is correctly proportional to the selected range $a$ to $b$ of variations in the measured variable $x$ appearing on the scale of recorder 26a, FIG. 2. This voltage may be recorded by a variance meter or recorder 228. Since the standard deviation (sigma) is simply the square root of the variance, potentiometer 226 is wound so that the potential derived from its tap is proportional to the square root of the movement of shaft 222. Again the proper scaling factor is obtained by applying the potentials $g(b)$ and $g(a)$ across the potentiometer 226, and the potential $g_3(\sigma_u)$ may be recorded on a sigma recorder 230.

It is seen also that the shaft 210 of servo 204 drives the variable tap 230a of a linear potentiometer having the potentials $g(a)$ and $g(b)$ applied to the ends thereof. The analog voltage appearing at the tap 230a represents the mean value, in terms of $(x-a)=u$, of the process, which may be indicated on a mean or $\bar{x}$ recorder 232.

Having described an apparatus in accordance with one preferred embodiment of the invention and the functioning of the various elements thereof, it is appropriate to recapitulate the overall theory and operation.

A gauging device is employed to continuously measure a variable characteristic $x$ of a material product 12 issuing from a processing apparatus 10. The abscissae of FIG. 3 represent the values of $x$. It is desired to maintain $x$ constant at a predetermined value which is referred to as the target value and shown by the vertical line 248.

Where the gauging device is equipped with a recorder as at 26a, FIG. 2, the recorder is usually equipped with a target pointer and pen assembly 240. The pointer is adjustable to any point across the recorder scale 32 by means of a setting knob 242. The ink pen (not shown) of assembly 240 will then draw a target line 244 on the recorder chart. By either manual or automatic gauge control, an attempt is made to maintain the process constant at the target value.

However, as is shown by the wandering trace 246, the process unavoidably varies more or less because of the inherent variability of men, machines and materials. Thus $x$ does not always have the single value shown by the line 248, FIG. 3; instead the line widens out to form the density function $y=f(x)$. In this function each value of $y$ represents the probability that a unit sample of material 12, when measured, will exhibit the corresponding value of $x$. As is customary, the scale of the graphs in FIG. 3 is greatly expanded in the $y$ direction, as is customary to avoid the flat appearance of the actual probability curves which have only unit area thereunder when extended to plus and minus infinity in the $x$ direction. More often than not, an actual process curve will deviate more or less from the familiar bell-shaped curve $y=\phi(x)$ shown in dotted lines which is the normal density function, and will exhibit some degree of skewness.

The specific values $a$ and $b$ of the variable $x$ are generally selected to be equidistant from the target value thereof, and so that the range of values $a$ to $b$ will encompass all of the possible variations in $x$. The amount by which the measured value of $x$ exceeds the value $a$ is designated as $u$, and is represented by the analog $g(u)$.

The analog to digital converter divides the range of values $a$ to $b$ into a number of $n'$ of equal intervals; in the example, nine intervals are used. Each of the counters in section 80 records the number or unit samples of material 12 whose $x$ value falls within a corresponding interval. This last number divided by the total number of samples in all of the counters gives the probability that a sample $x$ value will fall in that interval. In the analog computations, each voltage output from the calibrating network 190 is given with reference to the voltage output from the potentiometer 208. Accordingly the factor $f(N)$ representing the total number of samples is taken as unity, and accordingly the general factor $f(n_k)$ represents the probability that a given sample $x$ value will fall in the $k$th interval.

In FIG. 3 there is shown a step function $y=f(x_k)$ which approximates the process density function $y=f(x)$. One may plot a curve using a number $n'$ of intervals having arbitrary unit length $\Delta d$ along the $x$ axis, and using the factors $f(n_k)$ as ordinates obtain a step function $y=f(n_k)$ as is shown in FIG. 3a. The latter will have the same shape as its counterpart as shown in FIG. 3 except that the intervals have a constant unit length ($\Delta d=1$) whereas the function in FIG. 3 has intervals of variable length ($\Delta u$) depending on the selected range $(b-a)$.

The expectation of $d$ in FIG. 3a is given by $$E(d)=\sum_{k=1}^{n'}d_k f(n_k)$$

and since the length of each $d$-interval $\Delta d$ is unity, $d_k$ may be replaced by $k$. Therefore $$E(d)=\sum_{k=1}^{n'}k f(n_k) \quad (2)$$

its voltage analog appears at the output 202 of the summing amplifier 200 and its translated by the servo 204 to a proportional mechanical movement of the shaft 210 thereof. This mechanical analog is converted from the constant $d$-scale of magnitude to the variable $u$-scale by the multiplying potentiometer 230, whereby $E(d)$ is converted to $E(u)$. The recorder 232 has the conventional zero suppression and a scale which may be the same as scale 32 on recorder 26a, which is calibrated in units of the process variable $x$. It is recalled that $x=(u+a)$, so that the quantity $E(x)$, also referred to as $\bar{x}$ or the mean value of $x$, is simply a recording of $E(u)$ with the constant $a$ added thereto.

The expectation of $d^2$ is given by $$E(d^2)=\sum_{k=1}^{n'}k^2 f(n_k) \quad (3)$$

and the voltage analog thereof is the sum of the voltages delivered to the input of summing amplifier 216 from the taps of potentiometers 192a and 194b–194i. The variance of $d$ is given by $$\sigma_d^2 = E(d^2) - [E(d)]^2 \quad (4)$$

and accordingly the summing amplifier 216 further receives from the output of the sign changing amplifier 214 a voltage analog of $[E(d)]^2$. The voltage analog of $\sigma_d^2$ appears at the output 218 of the summing amplifier and is translated by the servo 220 to a proportional mechanical movement of the shaft 222 thereof. This mechanical analog is converted from the constant $d$-scale of magnitude to the variable $u$-scale by the multiplying potentiometer 224 whereby $\sigma_d^2$ is converted to $\sigma_u^2$. Since the variance of $u$ is the same quantity as the variance of $(u+a)$ or $x$, that is $$\sigma_x^2 = \sigma_u^2 = \sigma_{(u+a)}^2 \quad (5)$$

the analog voltage $g_2(\sigma_u^2)$ appearing at the tap 224a is directly recorded by recorder 228 to give the variance of the process variable $x$.

Since the variance of $\sigma^2$ is generally a more convenient figure to use than the standard deviation $\sigma$, it is not always required that the computer provide a direct indication of $\sigma$. However, a number of expedients may be used to provide such an indication. For example, the scale (not shown) of recorder 228 may carry indications of both $\sigma^2$ and $\sigma$ in the manner of the B and D scales of a conventional slide rule, whereon when the hairline indicates a given number on the B scale it simultaneously indicates the square root of said number on the D scale.

In the illustrated device, FIG. 1b, the potentiometer 226 winding is conventionally arranged to deliver a voltage proportional to the square root of the movement of its top 226a, thus providing a voltage analog $g_3(\sigma_u)$ which is recorded as the standard deviation $\sigma_x$ of the process variable $x$.

It will be noted that servos 204 and 220 are respectively equipped with clamp switches 240 and 242 controlled by the clock timer 166 as is indicated by the dotted line connection 244. These switches are closed to short circuit of "clamp" the inputs of the servo amplifiers (not shown) in a conventional manner after the $E(d)$ and $\sigma_d^2$ voltages have been applied to the inputs of the servos for a length of time sufficient for the mechanical systems to reach a point of balance. Thus the servos maintain a steady indication of the means and variance figures throughout the time that the various switching operations are accomplished in the networks 180. The switches 240 and 242 are not reopened by timer 166 to "unclamp" the servos until the system is ready to provide the next readout indication.

Referring now to FIG. 4, there are illustrated in somewhat disconnected fashion certain portions of the apparatus of FIGS. 1a and 1b, showing one modification of the analyzer whereby savings in the cost of the equipment can be effected in the event that a fully continuous analysis of the process is not necessary. This modification is characterized in particular by the omission of the buffer storage arrangement and by a periodic, discontinuous mode of operation. Structurally, the modification involves the deletion, in FIGS. 1a and 1b, of gates 150, relay section 140, networks 180 and the delay system 142, 144 and 146. The gate 134 is required in all cases. The clock timer 166 is replaced by a more elaborate timer 166a which performs one or two additional functions. Each of the counters as at 80a in the accumulator section 80 is replaced by a more complex device as at 800a having a step voltage generator associated therewith, in the manner of the counter and reference voltage generator 64a and 64b utilized in the analog to digital converter system. A further example of a suitable counter and step voltage generator suitable for the purpose is described in Patent No. 2,807,717, particularly in connection with the description of the translator unit 14 thereof.

In the operation of the FIG. 4 system, when N product units have been evaluated, the gate 134 is closed by the removal of the enabling signal on line 130b as hereinbefore described. This disables the analog to digital converter and time modulator system. The count standing in the accumulator section 80 is maintained while voltages proportional to the respect counter readings are delivered over lines 802a–802i from the step voltage generators of section 80 directly to the calibrating potentiometer networks of sections 190 and while the analog computations are carried out as in the previously described system, that is, until the servos 204 and 220 have come to balance and are clamped by timer connection 244. During this time of course the material 14 passing through the gauge 14 cannot be evaluated because the counters 800 in section 80 are unable to accept any tally, being otherwise occupied in maintaining their data storage function and count-proportional analog outputs.

However, after the servos 204 and 220 have been clamped, the clock timer 166a, via its connection 804, will energize the reset pulse amplifier 148, which in turn resets the counters 800a–800i as counters 80a–80i, FIG. 1a are reset as hereinbefore described, and causes gate 134 to be re-enabled to again place the time modulator, analog to digital conversion and accumulator systems in operation to evaluate the material 12 passing through the gauging device.

Also it is seen that the analog voltages, representing the results of the statistical computations, may all be recorded sequentially on a common recorder 806, by providing a suitable recorder arrangement and a multiplexing switch 808 controlled by a connection 810 to the clock timer 166a. For a more detailed description of one type of suitable recorder arrangement, reference may be made to Patent No. 2,965,300.

While the invention has been described as a specific apparatus, it is apparent that a great many arrangements, modifications and outwardly quite different embodiments can be made without departing from the scope of the invention as is set forth in the appended claims.

What is claimed is:

1. In an automatic data processing apparatus wherein the density function of a variable quantity is indicated by the count distribution in a series of counters, an electrical power source; a plurality of digital divider networks connected to said power source, each of said networks being controlled by an associated one of said counters and each providing a pair of analog signals, each of said signals comprising a portion of the output of said source, the first signal in said pair being proportional to the product of the number of counts registered by said associated counter and a weighting factor representing the order of said associated counter in said series, the second signal in said pair being proportional to the product of said number of counts and the square of said weighting factor; means for adding all of said first signals to obtain a first analog sum signal, means for adding all of said second signals to obtain a second analog sum signal, means for squaring said first analog sum signal to provide a mean squared signal, and means responsive to the difference between said second analog sum signal and said mean squared signal for indicating the variance of said quantity.

2. In an automatic data processing apparatus wherein the density function of a variable quantity is indicated by the count distribution in a series of $n'$ counters, a series of $n'$ means each responsive to the count $n_k$ registered by an associated $k$th one of said counters for providing an analog signal proportional to said $n_k$, means providing an analog signal proportional to the total count N registered by all said counters, means for computing the ratio of $n_k$ to N to provide a plurality of $n'$ analog signals $f(n_k)$ each indicating the probability of a count being registered in said $k$th counter, means for weighting each of said $f(n_k)$ signals by multiplying the same by the integer $k$ indicating the position of said $k$th counter in said series to provide a $k$-weighted signal, means for weighting each of said $f(n_k)$ signals by multiplying the same by $k^2$ to provide a $k^2$-weighted signal, means for summing all of said $k$-weighted signals to provide an analog signal representing $$E(d) = \sum_{k=1}^{n'} k f(n_k)$$

means for summing all of said $k^2$-weighted signals to provide an analog signal representing $$E(d^2) = \sum_{k=1}^{n'} k^2 f(n_k)$$

means for squaring said $E(d)$ signal to provide an analog signal representing $[E(d)]^2$ and means for subtracting said last-mentioned analog signal from said $E(d)^2$ signal to provide an analog signal representing $\delta_d^2$ which is proportional to the variance of said quantity.

3. Electronic apparatus for statistically analyzing the flow of a material product with regard to a measurable characteristic $x$ of units of said product, comprising means including gauging means adjacent said flow for providing an analog signal $g(x)$ indicative of the value of said characteristic and being variable between a low limit $g(a)$ and a high limit $g(b)$, means responsive to the movement of said flow for providing a series of unit signals each indicating the passage of one of said product units, a series of $n'$ counters for said unit signals, analog to digital converter means for dividing the range of values of $g(x)$ from $g(a)$ to $g(b)$ into a series of $n'$ equal intervals, gating means controlled by said analog to digital converter means for routing each of said unit signals only to the $k$th one of said plurality of counters in response to said $g(x)$ signals having a value within the $k$th interval of said series of intervals thereby indicating a corresponding value $x_k$ of said product characteristic, an electrical power source; a series of $n'$ digital divider networks connected to said power source, each of said networks being controlled by an associated one of said counters and each providing a pair of analog signals, each of said signals in said pair comprising a portion of the output of said source, the first signal in said pair being proportional to the product of the number of counts registered by said associated counter and a weighting factor representing the order of said associated counter in said series, the second signal in said pair being proportional to the product of said number of counts and the square of said weighing factor; means for adding all of said first signals to obtain a first analog sum signal, means for adding all of said second signals to obtain a second analog sum signal, means for squaring said first analog sum signal to provide a mean squared signal, and means responsive to the difference between said second analog sum signal and said mean squared signal for indicating the variance of said characteristic.

4. Apparatus as in claim 3 which includes means responsive to said first analog sum signal for indicating the mean value of said characteristic.

5. Apparatus as in claim 3 which includes analog computer means responsive to said difference for indicating the square root thereof, said root being proportional to the standard deviation of said characteristic.

6. Apparatus as in claim 3 which includes means for generating an analog signal proportional to the magnitude of the difference between the values of said $g(a)$ and $g(b)$ limits and means for multiplying said variance indication by said last-mentioned difference-proportional signal whereby said variance indication is made proportional to the range of values between said limits.

7. Apparatus as in claim 3 which includes means responsive to said first analog sum signal for indicating the means value of said characteristic, means for generating an analog signal proportional to the magnitude of the difference between the values of said $g(a)$ and $g(b)$ limits, means for multiplying said mean value indication by said last-mentioned difference-proportional signal whereby said mean indication is made proportional to the range of values between said limits, and means for adding to said mean indication the value of said characteristic indicated by $g(a)$.

8. Electronic apparatus for statistically analyzing the flow of a material product with regard to a measurable characteristic of units of said product, comprising gauging means adjacent said flow for providing an analog signal $g(x)$ indicative of the value of said characteristic, means responsive to the movement of said flow for providing a series of unit signals each indicating the passage of one of said product units, a plurality of $n'$ counters for said unit signals, means for setting a lower limit $g(a)$ and a higher limit $g(b)$ for said $g(x)$ signal in accordance with an expected range of values thereof, analog to digital converter means for dividing said range of values from $g(a)$ to $g(b)$ into a plurality of $n'$ equal intervals, gating means controlled by said analog to digital converter means for routing each of said unit signals only to the $k$th one of said plurality of counters in response to said $g(x)$ signal's having a value within the $k$th interval of said plurality of intervals thereby indicating a corresponding value $x_k$ of said product characteristic, a plurality of $n'$ means each responsive to the number of counts $n_k$ in the $k$th one of said counters for generating an analog signal having a value representing the product $x_k f(n_k)$ and another analog signal representing the product $x_k^2 f(n_k)$, wherein $f(n_k)$ indicates the probability of a count being registered in said $k$th counter, means for summing all of said $x_k f(n_k)$ signals to provide an analog signal representing the expectation $E(x)$ of said product characteristic, means for summing all of said $x_k^2 f(n_k)$ signals to provide an analog signal representing the expectation $E(x^2)$ of the square of said product characteristic, means for squaring said $E(x)$ signal to provide a signal representing $[E(x)]^2$ and means responsive to the difference between said $E(x^2)$ and $[E(x)]^2$ signals for indicating the variance of said characteristic.

9. In electronic apparatus for statistically analyzing the flow of a material product with regard to a measurable characteristic $x$ of units of said product, means including gauging means adjacent said flow for providing an analog signal $g(x)$ indicative of the value of said characteristic, means responsive to the movement of said flow for providing a series of unit signals each indicating the passage of one of said product units, analog to digital converter means receiving said $g(x)$ signal and having a plurality of $n'$ gating output signal lines for providing on the $k$th one of said lines a gating signal indicating that said characteristic has a value included in an interval $x_k$ in a series of $n'$ intervals into which the expected range of values of $x$ is divided, a plurality of $n'$ pulse counters each designated an $x_k$ counter; a programmed switching device having an operating cycle initiated by each of said product unit signals, said cycle comprising enabling said analog to digital converter, generating a registration pulse, and resetting and disabling said converter; a plurality of $n'$ gates each having a control input terminal connected to an associated one of said gating signal lines for routing said registration pulse only to the $k$th one of said pulse counters associated with the $k$th gate connected to said $k$th gating signal line, means for counting said product unit pulses and for disabling said programmed switching device when a predetermined count of N unit pulses has been accumulated, means providing an analog signal proportional to said count of N unit pulses, and a plurality of $n'$ digital to analog converter means each controlled by an associated $k$th one of said $x_k$ counters for providing an analog signal proportional to the count $n_k$ therein, whereby the ratio of said $n_k$-proportional signal to said N-proportional signal is proportional to the probability $f(x_k)$ that a count is registered in said $k$th pulse counter.

10. Apparatus as in claim 9 including means for multiplying each of said $n_k$-proportional signals by a weighting factor indicating a value of said $x$ characteristic included in said $x_k$ interval, means for summing the products of said multiplications, means for computing the ratio of the sum of said products to said N-proportional signal, and means responsive to said ratio for indicating the mean value of said characteristic.

11. Apparatus as in claim 9 which includes analog computer means including electromechanical servomechanism means responsive to said $n_k$-proportional signals and having a movable member for indicating a statistical function thereof, timer means for allowing said programmed switching means to remain disabled for a period of time sufficient to allow said movable member to come to rest at a position indicating said function and means energized by said timer at the end of said period for resetting said product unit and $x_k$ pulse counters and for re-enabling said programmed switching means.

References Cited in the file of this patent

UNITED STATES PATENTS

| | | |
|---|---|---|
| 2,870,436 | Kuder | Jan. 20, 1959 |
| 2,965,300 | Radley et al. | Dec. 20, 1960 |